(12) United States Patent
Moody et al.

(10) Patent No.: US 9,465,505 B1
(45) Date of Patent: Oct. 11, 2016

(54) REPUTATION BASED COLLABORATION SESSION

(71) Applicant: Google Inc., Mountain View, CA (US)

(72) Inventors: Paul Moody, Mountain View, CA (US); Anand Paka, San Francisco, CA (US)

(73) Assignee: Google Inc., Mountain View, CA (US)

( * ) Notice: Subject to any disclaimer, the term of this patent is extended or adjusted under 35 U.S.C. 154(b) by 202 days.

(21) Appl. No.: 13/893,790

(22) Filed: May 14, 2013

(51) Int. Cl.
*G06F 3/048* (2013.01)
*G06Q 50/00* (2012.01)

(52) U.S. Cl.
CPC ............... *G06F 3/048* (2013.01); *G06Q 50/01* (2013.01)

(58) Field of Classification Search
CPC ............... H04L 51/04–51/046; H04L 51/12; H04L 51/32; H04L 28/08378; H04L 67/1057; G06Q 50/01
See application file for complete search history.

(56) References Cited

U.S. PATENT DOCUMENTS

| | | | | |
|---|---|---|---|---|
| 2002/0095305 A1* | 7/2002 | Gakidis | ................. | G06Q 10/10 705/300 |
| 2003/0028596 A1* | 2/2003 | Toyota | ................. | H04L 63/083 709/204 |
| 2006/0149708 A1* | 7/2006 | Lavine | ................. | 707/3 |
| 2006/0287106 A1* | 12/2006 | Jensen | ................. | A63F 13/12 463/42 |
| 2007/0078675 A1* | 4/2007 | Kaplan | ................. | G06Q 10/10 705/26.1 |
| 2008/0175266 A1* | 7/2008 | Alperovitch et al. | ........ | 370/465 |
| 2008/0229215 A1* | 9/2008 | Baron et al. | ................. | 715/751 |
| 2009/0006115 A1* | 1/2009 | Schwarz | ................. | G06Q 30/06 705/348 |
| 2009/0157490 A1* | 6/2009 | Lawyer | ................. | 705/11 |
| 2010/0005099 A1* | 1/2010 | Goodman et al. | ................. | 707/9 |
| 2011/0004693 A1* | 1/2011 | Rehfuss | ................. | G06Q 30/02 709/229 |
| 2013/0024513 A1* | 1/2013 | Sacks et al. | ................. | 709/204 |

FOREIGN PATENT DOCUMENTS

WO  WO 2010009281 A2 *  1/2010

\* cited by examiner

*Primary Examiner* — Jennifer To
*Assistant Examiner* — Liang Li (57) ABSTRACT

A method and computer system for determining a reputation threshold requirement for participating in a collaboration session. A determination is made whether a reputation of a user satisfies the reputation threshold requirement for the collaboration session. Access to the collaboration session is enabled if the reputation of the user satisfies the reputation threshold requirement for the collaboration session. Access to the collaboration session is disabled if the reputation of the user fails to satisfy the reputation threshold requirement for the collaboration session.

20 Claims, 7 Drawing Sheets

REPUTATION BASED COLLABORATION SESSION

BACKGROUND

When a website, such as a popular news site, offers its readers a chance to contribute to a conversation (e.g., a particular news story via, e.g., video conferences, commenting, etc.), there may be little to no controls for the website to limit users from contributing to the conversation. Some of the users may be disruptive and/or may not contribute to the quality of the conversation. Additionally, with so many news stories and so many different websites covering the same story, participants may have a difficult time deciding which conversation in which to participate.

BRIEF SUMMARY OF DISCLOSURE

In one implementation, a method, performed by one or more computing devices, comprises determining, by a computing device, a reputation threshold requirement for participating in a video conference session. A determination may be made whether a reputation of a user satisfies the reputation threshold requirement for the video conference session. The reputation of the user may be based upon, at least in part, one or more of a number of users connected to the user, a number of previous contributions by the user, and a number of social actions associated with at least a portion of the number of previous contributions by the user. Access to the video conference session may be enabled if the reputation of the user satisfies the reputation threshold requirement for the video conference session. Access to the video conference session may be disabled if the reputation of the user fails to satisfy the reputation threshold requirement for the video conference session.

In one implementation, a method, performed by one or more computing devices, comprises determining, by a computing device, a reputation threshold requirement for participating in a collaboration session. A determination may be made whether a reputation of a user satisfies the reputation threshold requirement for the collaboration session. Access to the collaboration session may be enabled if the reputation of the user satisfies the reputation threshold requirement for the collaboration session. Access to the collaboration session may be disabled if the reputation of the user fails to satisfy the reputation threshold requirement for the collaboration session.

One or more of the following features may be included. Enabling access to the collaboration session may include providing an object that when selected requests that the user connect to the collaboration session. A determination may be made of a reputation of an entity enabling access to the collaboration session. A determination may be made of a reputation of an author of a topic for the collaboration session. Determining the reputation of the author of the topic for the collaboration session may include determining whether a relationship exists between the author of the topic for the collaboration session and an entity enabling access to the collaboration session. The relationship may include a connection between the author of the topic for the collaboration session and the entity enabling access to the collaboration session. The reputation of the user may be based upon, at least in part, a number of users connected to the user. The reputation of the user may be based upon, at least in part, a number of previous contributions by the user. Determining whether the reputation of the user satisfies the reputation threshold requirement for the collaboration session may include comparing the reputation of the user with a reputation profile for the collaboration session.

In another implementation, a computing system includes a processor and a memory configured to perform operations comprising determining a reputation threshold requirement for participating in a collaboration session. A determination may be made whether a reputation of a user satisfies the reputation threshold requirement for the collaboration session. Access to the collaboration session may be enabled if the reputation of the user satisfies the reputation threshold requirement for the collaboration session. Access to the collaboration session may be disabled if the reputation of the user fails to satisfy the reputation threshold requirement for the collaboration session.

One or more of the following features may be included. Enabling access to the collaboration session may include providing an object that when selected requests that the user connect to the collaboration session. A determination may be made of a reputation of an entity enabling access to the collaboration session. A determination may be made of a reputation of an author of a topic for the collaboration session. Determining the reputation of the author of the topic for the collaboration session may include determining whether a relationship exists between the author of the topic for the collaboration session and an entity enabling access to the collaboration session. The relationship may include a connection between the author of the topic for the collaboration session and the entity enabling access to the collaboration session. The reputation of the user may be based upon, at least in part, a number of users connected to the user. The reputation of the user may be based upon, at least in part, a number of previous contributions by the user. The reputation of the user may be based upon, at least in part, a number of social actions associated with at least a portion of the number of previous contributions by the user. Determining whether the reputation of the user satisfies the reputation threshold requirement for the collaboration session may include comparing the reputation of the user with a reputation profile for the collaboration session.

In another implementation, a computer program product resides on a computer readable storage medium that has a plurality of instructions stored on it. When executed by a processor, the instructions cause the processor to perform operations comprising determining a reputation threshold requirement for participating in a collaboration session. A determination may be made whether a reputation of a user satisfies the reputation threshold requirement for the collaboration session. Access to the collaboration session may be enabled if the reputation of the user satisfies the reputation threshold requirement for the collaboration session. Access to the collaboration session may be disabled if the reputation of the user fails to satisfy the reputation threshold requirement for the collaboration session.

One or more of the following features may be included. Enabling access to the collaboration session may include providing an object that when selected requests that the user connect to the collaboration session. A determination may be made of a reputation of an entity enabling access to the collaboration session. A determination may be made of a reputation of an author of a topic for the collaboration session. Determining the reputation of the author of the topic for the collaboration session may include determining whether a relationship exists between the author of the topic for the collaboration session and an entity enabling access to the collaboration session. The relationship may include a connection between the author of the topic for the collaboration session and the entity enabling access to the collaboration session. The reputation of the user may be based upon, at least in part, a number of users connected to the user. The reputation of the user may be based upon, at least in part, a number of previous contributions by the user. The reputation of the user may be based upon, at least in part, a number of social actions associated with at least a portion of the number of previous contributions by the user. Determining whether the reputation of the user satisfies the reputation threshold requirement for the collaboration session may include comparing the reputation of the user with a reputation profile for the collaboration session.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

When a website, such as a popular news site, offers its readers a chance to contribute to a conversation (e.g., a particular news story via, e.g., video conferences, commenting, etc.), there may be little to no controls for the website to limit users from contributing to the conversation. Some of the users may be disruptive and/or may not contribute to the quality of the conversation. Additionally, with so many news stories and so many different websites covering the same story, participants may have a difficult time deciding which conversation in which to participate. In some implementations, as will be discussed in greater detail below, using certain metrics to obtain a reputation of the creator of the conversation, those who might be able to join the conversation may make a better informed decision as to whether they want to join the conversation. Similarly, using certain metrics to obtain a reputation of those that might want to join the conversation, the creator of the conversation may make a better informed decision as to who will be allowed to join the conversation.

Figure 1:
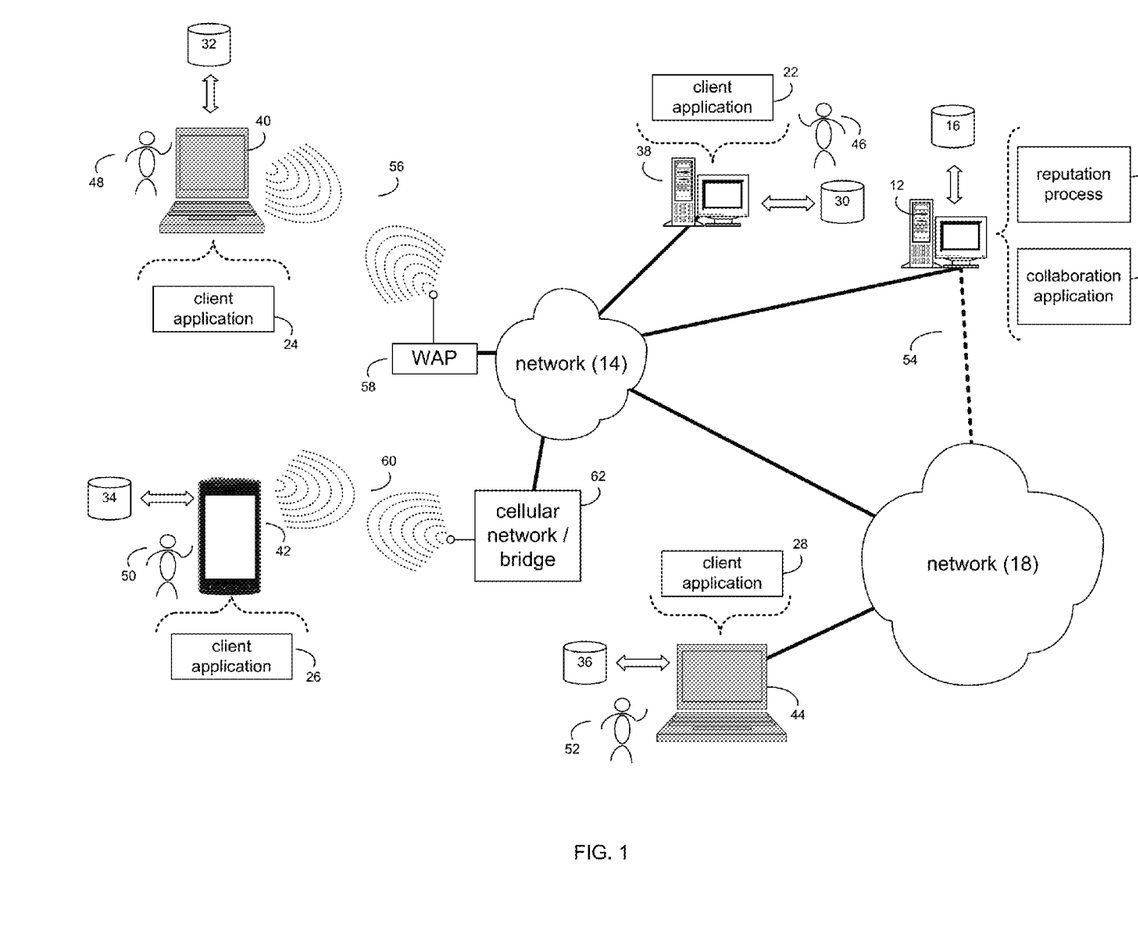
FIG. 1 is an illustrative diagrammatic view of a reputation process coupled to a distributed computing network according to one or more implementations of the present disclosure.

Referring to FIG. 1, there is shown reputation process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, reputation process 10 may determine a reputation threshold requirement for participating in a collaboration session. A determination may be made whether a reputation of a user satisfies the reputation threshold requirement for the collaboration session. Access to the collaboration session may be enabled if the reputation of the user satisfies the reputation threshold requirement for the collaboration session. Access to the collaboration session may be disabled if the reputation of the user fails to satisfy the reputation threshold requirement for the collaboration session.

The instruction sets and subroutines of reputation process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Reputation process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a collaboration application (e.g., collaboration application 20), examples of which may include, but are not limited to, e.g., a web conferencing application, a video conferencing application, a voice-over-IP application, a video-over-IP application, or other application that allows for virtual meeting and/or remote collaboration. Reputation process 10 and/or collaboration application 20 may be accessed via client applications 22, 24, 26, 28. Reputation process 10 may be a stand alone application, or may be an applet/application/script that may interact with and/or be executed within collaboration application 20 and/or one or more of client applications 22, 24, 26, 28. Collaboration application 20 may be a stand alone application, or may be an applet/application/script that may interact with and/or be executed within reputation process 10 and/or one or more of client applications 22, 24, 26, 28. One or more of client applications 22, 24, 26, 28 may be a stand alone application, or may be an applet/application/ script that may interact with and/or be executed within reputation process 10 and/or collaboration application 20. Examples of client applications 22, 24, 26, 28 may include, but are not limited to, e.g., a web conferencing application, video conferencing application, voice-over-IP application, a video-over-IP application, or other application that allow for virtual meeting and/or remote collaboration, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36 coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), a personal computing device (e.g., a watch (not shown)), augmented reality displays, and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of reputation process 10 (and vice versa). Accordingly, reputation process 10 may be a purely server-side application, a purely client-side application, or a hybrid server-side/client-side application that is cooperatively executed by one or more of client applications 22, 24, 26, 28 and/or reputation process 10.

One or more of client applications 22, 24, 26, 28 may be configured to effectuate some or all of the functionality of collaboration application 20 (and vice versa). Accordingly, collaboration application 20 may be a purely server-side application, a purely client-side application, or a hybrid server-side/client-side application that is cooperatively executed by one or more of client applications 22, 24, 26, 28 and/or collaboration application 20. As one or more of client applications 22, 24, 26, 28, reputation process 10, and collaboration application 20, taken singly or in any combination, may effectuate some or all of the same functionality, any description of effectuating such functionality via one or more of client applications 22, 24, 26, 28, reputation process 10, collaboration application 20, or combination thereof, and any described interaction(s) between one or more of client applications 22, 24, 26, 28, reputation process 10, collaboration application 20, or combination thereof to effectuate such functionality, should be taken as an example only and not to limit the scope of the disclosure.

Users 46, 48, 50, 52 may access computer 12 and reputation process 10 (e.g., using one or more of client electronic devices 38, 40, 42, 44) directly through network 14 or through secondary network 18. Further, computer 12 may be connected to network 14 through secondary network 18, as illustrated with phantom link line 54. Reputation process 10 may include one or more user interfaces, such as browsers and textual or graphical user interfaces, through which users 46, 48, 50, 52 may access reputation process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
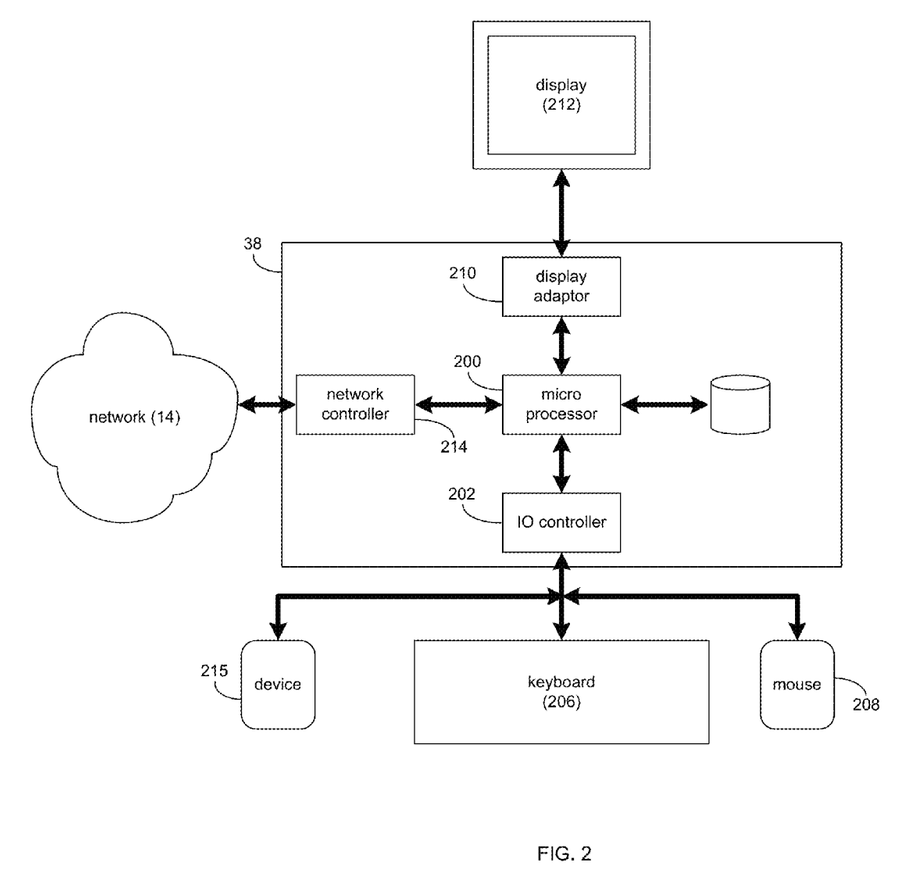
FIG. 2 is a diagrammatic view of a client electronic device of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, reputation process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device. An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

As discussed above and referring also to FIGS. 3-7, reputation process 10 may determine 300, by a computing device, a reputation threshold requirement for participating in a collaboration session. Reputation process 10 may determine 302 whether a reputation of a user satisfies the reputation threshold requirement for the collaboration session. Reputation process 10 may enable 304 access to the collaboration session if the reputation of the user satisfies the reputation threshold requirement for the collaboration session. Reputation process 10 may disable 306 access to the collaboration session if the reputation of the user fails to satisfy the reputation threshold requirement for the collaboration session.

Figure 4:
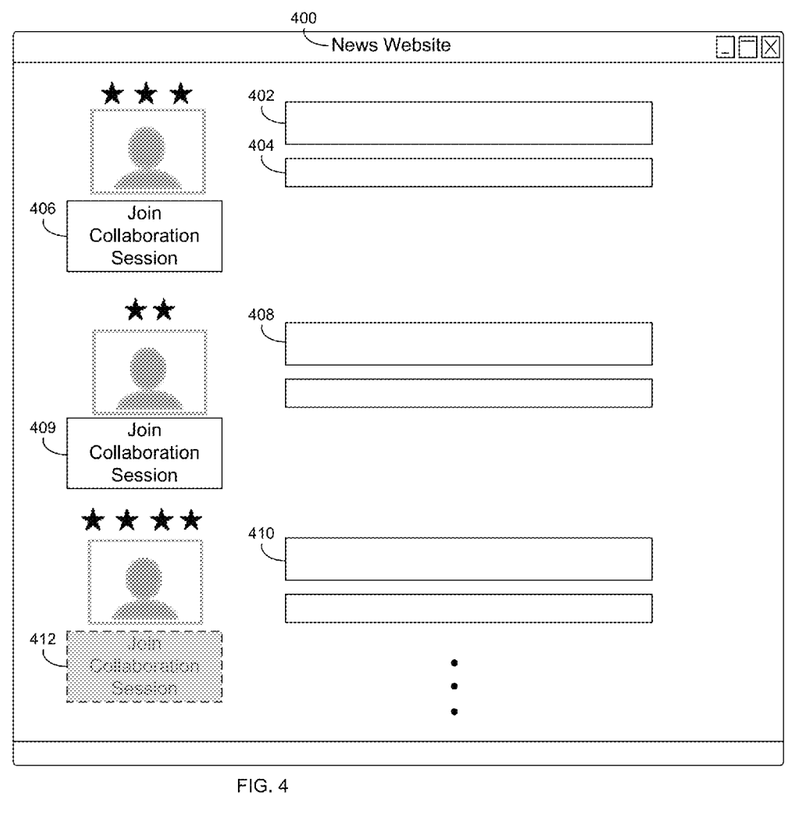
FIG. 4 is an illustrative diagrammatic view of a screen image displayed by the reputation process of FIG. 1 according to one or more implementations of the present disclosure.

Assume for example purposes only, and referring at least to FIG. 4, that website 400, such as a website that posts online articles about news events, has posted article 402 about a recent event, and has made at least a snippet of article 402 available to the public via the Internet. In some implementations, website 400 may include a ranked list of one or more sources 404 for each article in the news cluster (e.g., other websites that may have posted an article about the same news story). Further assume in the example that the author of the article (and/or the administrator of the website) wants to allow other users to be able to voice their opinion, comment, or discuss the article (e.g., via a video "chatting" session). In the example, further assume that the author wants to restrict such a discussion between those users that are likely to increase the quality of the discussion, rather than those that are likely to be disruptive (e.g., using profanity, using hate speech, etc.). One example technique to limit the discussion between those users that are likely to increase the quality of the discussion may be to use the reputation of the user as a qualifier to participate. For example, in some implementations, reputation process 10 may determine 300, by a computing device (e.g., computer 12), a reputation threshold requirement for participating in a collaboration session (e.g., the video conferencing "chatting session"). For instance, as will be discussed in greater detail below, if a user (e.g., user 48) wants to contribute to the discussion about the article, the author of the article (e.g., user 46) (and/or the administrator of the website) may via reputation process 10 set a reputation threshold requirement that user 48 (and other users) may need to have before such participation may be permitted.

Figure 3:
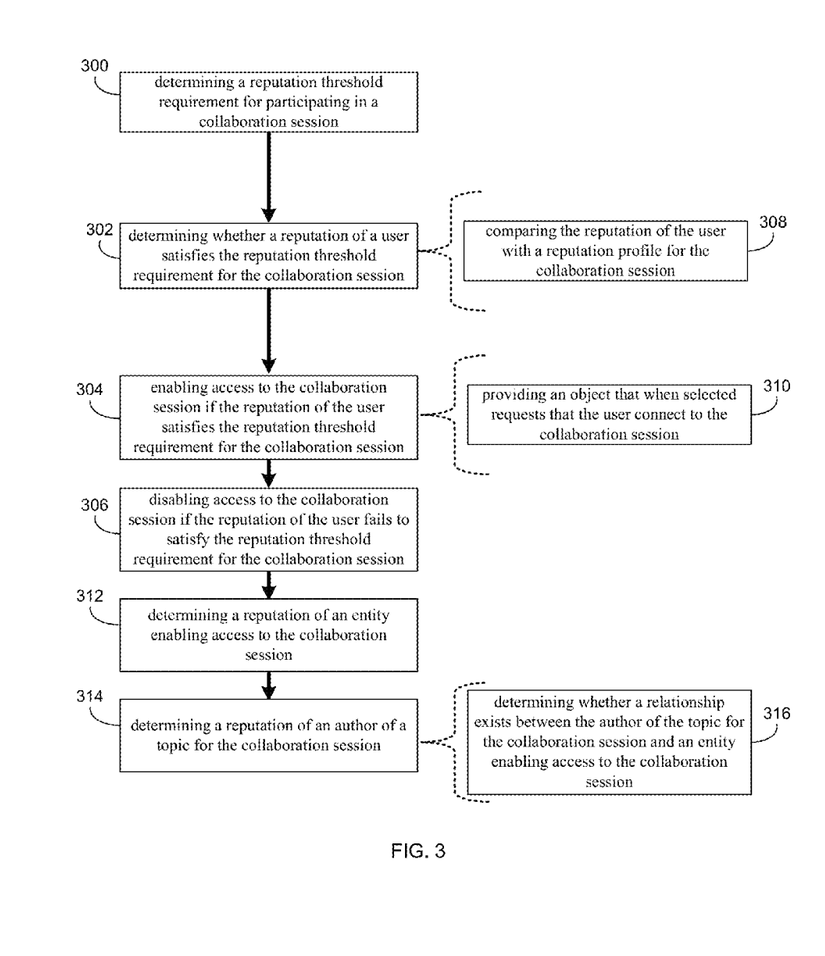
FIG. 3 is an illustrative flowchart of the reputation process of FIG. 1 according to one or more implementations of the present disclosure.

In some implementations, reputation process 10 may determine 302 whether a reputation of a user satisfies the reputation threshold requirement for the collaboration session. For instance, the reputation of the user may be based upon, at least in part, a number of users connected to the user. For example, user 48 may be connected to (e.g., "followed by" and/or "following" via, e.g., an example RSS feed or the like), e.g., ≥50 users and ≥100 users respectively. Other values and/or ranges (e.g., ≥100, ≥1,000, ≥10,000, etc.) may also be used without departing from the scope of this disclosure. In the example, the more users that follow user 48 (and/or the more users that user 48 follows), the higher the reputation of user 48. Conversely, the fewer users that follow user 48 (and/or the fewer users that user 48 follows), the lower the reputation of user 48. In some implementations, the reputation of user 48 may be increased if user 48 is followed by the author of the article (e.g., user 46) and/or the source posting the article, by a factor greater than if user 48 were followed by a user that was not user 46 or the source posting the article. Similarly, the reputation of user 48 may be increased if user 48 is following the author of the article (e.g., user 46) and/or the source posting the article, by a factor greater than if user 48 were following a user that was not user 46 or the source posting the article.

In some implementations, the reputation of the user may be based upon, at least in part, a number of previous contributions by the user. For example, user 48 may have previously contributed to one or more other news articles, e.g., 50 times. In the example, the more contributions made by user 48, the higher the reputation of user 48. Conversely, the fewer contributions made by user 48, the lower the reputation of user 48. Contributions may include but are not limited to, e.g., commenting on an article, participating in video collaboration sessions, posting articles, etc. In some implementations, the reputation may be dependent upon the topic of the contribution. For example, if the article topic is "pets", then only those contributions made by user 48 about pets (or a related topic such as animals) may be included in the determination 302 of the reputation of user 48 (at least for the topic of "pets"). In the example, if user 48 had contributed 50 times total, but only 40 of those 50 contributions were about pets, then reputation process 10 may determine 302 the reputation of user 48 based upon, at least in part, 40 previous contributions. In some implementations, the total number of previous contributions may be used by reputation process 10 to determine 302 the reputation of user 48.

In some implementations, the reputation of the user may be based upon, at least in part, a number of social actions associated with at least a portion of the number of previous contributions by the user. For instance, continuing with the above example, other users may have, e.g., "liked", "shared", "reshared", commented upon, etc. one or more of the previous contributions made by user 48. In the example, the more social interactions made by other users for contributions made by user 48, the higher the reputation of user 48. Conversely, the fewer social interactions made by other users for contributions made by user 48, the lower the reputation of user 48. In some implementations, the number of social interactions made by other users for contributions made by user 48 may be topic specific. For example, if user 48 had contributed 50 times total, but only 40 of those 50 contributions were about pets, then reputation process 10 may determine 302 the reputation of user 48 (at least for the topic of pets) based upon, at least in part, only those social interactions made by other users for the 40 previous contributions. In some implementations, the total number of social interactions made by other users to all previous contributions of user 48 may be used by reputation process 10 to determine 302 the reputation of user 48.

Other examples of things that may effect the reputation of user 48 may be used without departing from the scope of this disclosure. For example, other users may rate the quality of the previous contributions made by user 48 (e.g., whether abuse was reported for the previous contributions, how well the previous contributions constructively added to the quality of the article, etc.), which may be aggregated as at least a portion of the reputation of user 48. As such, the description of using previous contributions, the number of social interactions upon those previous contributions, and the number of users connected to user 48, should be taken as an example only and not to limit the scope of this disclosure.

In some implementations, determining 302 whether the reputation of the user satisfies the reputation threshold requirement for the collaboration session may include reputation process 10 comparing 308 the reputation of the user with a reputation profile for the collaboration session. For instance, reputation process 10 may provide the author of article 402 (e.g., user 46) and/or the administrator of website 400 with a reputation profile that may be used when determining 300 the reputation threshold requirement for participating in the collaboration session. For example, and referring at least to FIG. 5, an example user interface of reputation profile 500 for article 402 (e.g., provided via reputation process 10, client application 22, collaboration application 20, or combination thereof) is shown. In the example, and continuing with the above example, reputation profile 500 may enable user 46 to establish the minimum reputation requirements for user 48 (and/or other users) to participate in the above-noted collaboration session. For instance, as established by user 46, reputation profile 500 may require that user 48 be followed by a minimum number of users before being allowed to participate in the collaboration session, which may be input by user 46 via, e.g., cursor 501 and drop down menu 502. In the example, as established by user 46, reputation profile 500 may require that user 48 be followed by user 46, followed by the source of article 402, following user 46, and/or following the source of article 402, or combination thereof, before being allowed to participate in the collaboration session, which may be input by user 46 via, e.g., "check box" 504 or the like.

Figure 5:
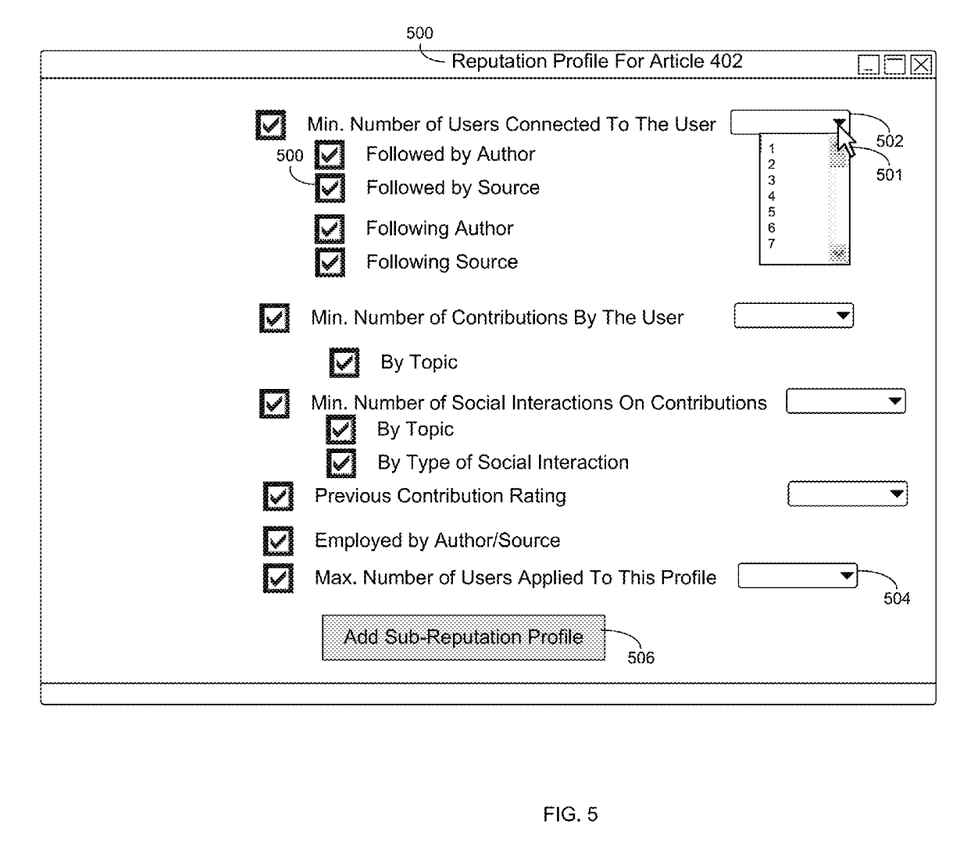
FIG. 5 is an illustrative diagrammatic view of a screen image displayed by the reputation process of FIG. 1 according to one or more implementations of the present disclosure.

In some implementations, user 46 may use the example check boxes to establish which parameters will be used to determine 300 the reputation requirements. In some implementations, reputation profile 500 may provide user 46 with the ability to add a custom parameter used to determine 300 the reputation requirements. In some implementations, reputation profile 500 may include one or more sub-reputation profiles (not shown) that may provide user 46 with the ability to customize the number of users to apply to a particular sub-reputation profile. For example, to provide diversity in the participants of the collaboration session, user 46 may use, e.g., dropdown menu 504, to establish that the parameters shown in reputation profile 500 may apply to, e.g., a maximum of 5 users. In the example, user 46 may also want a maximum (or minimum) number of users (e.g., 7 users) to participate in the collaboration session that do not follow user 46. In the example, user 46 may select, e.g., object 506, to create a sub-reputation profile (not shown) with different requirements for the same article 402 (e.g., using the same options shown in reputation profile 500 with different check boxes being selected). Thus, user 46 may diversify the reputations of users that are able to participate in the collaboration session instead of a "one size fits all" approach being applied to all users. For instance, even though reputation profile 500 requires users to follow user 46, the above-noted sub-reputation profile may still enable, e.g., a maximum of 7 users that do not follow user 46 to participate in the collaboration session. It will be appreciated that differing customized combinations of reputation profile 500 and/or sub-reputation profile(s) may be used without departing from the scope of this disclosure. As such, the particular combination of options selected for reputation profile 500 and/or sub-reputation profiles should be taken as an example only and not to otherwise limit the scope of this disclosure.

In some implementations, reputation process 10 may enable 304 access to the collaboration session if the reputation of the user satisfies the reputation threshold requirement for the collaboration session. For instance, and continuing with the above example, if reputation process 10 determines 302 that the reputation of user 48 satisfies the reputation threshold requirements for the collaboration session (e.g., as established by the above-noted reputation profile 500), reputation process 10 may enable 304 user 48 to participate in the collaboration session. In some implementations, and referring again to FIG. 4, enabling 304 access to the collaboration session may include reputation process 10 providing 310 an object that when selected requests that the user connect to the collaboration session. For instance, assume for example purposes only that user 48 is currently viewing website 400, which includes one or more articles (e.g., article 402, article 408, and article 410). Further assume that based upon the reputation profile(s) established for articles 402, article 408, and article 410, that user 48 is eligible to participate in the collaboration session for articles 402 and article 408, but not article 410. In the example, reputation process 10 may provide, e.g., object 406 for article 402 and object 409 for article 408, that when selected by user 48, connects user 48 to the respective collaboration session for the respective article, where user 48 may then participate in the respective collaboration session. For instance, if the collaboration session includes a video chatting session, user 48 may be enabled 304 to connect to and participate in that video chatting session. As another example, if the collaboration session includes a call-in conference, user 48 may be enabled 304 to call in to and participate in the call-in conference. As another example, if the collaboration session includes a blog, user 48 may be enabled 304 to comment or otherwise interact with the blog. As another example, if the collaboration session includes a collaboration space, user 48 may be enabled 304 to add, delete, view, and/or modify files within the collaboration space. Other examples of collaboration sessions and the particular access enabled 304 by reputation process 10 may be used without departing from the scope of the disclosure. As such, the description of the collaboration session including video chatting, call-in conferencing, commenting, or combination thereof should be taken as an example only and not to limit the scope of the disclosure.

In some implementations, reputation process 10 may disable 306 access to the collaboration session if the reputation of the user fails to satisfy the reputation threshold requirement for the collaboration session. For instance, continuing with the above-example where based upon the reputation profile(s) established for articles 402, article 408, and article 410, that user 48 is eligible to participate in the collaboration session for articles 402 and article 408, but not article 410. In the example, while reputation process 10 may provide, e.g., object 406 for article 402 and object 409 for article 408, that when selected by user 48, connects user 48 to the respective collaboration session for the respective article where user 48 may then participate in the respective collaboration session, reputation process 10 may disable 306 access to the collaboration session of article 410, thereby preventing user 48 from connecting and/or participating in the collaboration session for article 410. In some implementations, object 412 may be "grayed out" to disable 306 access to the collaboration session. In some implementations, article 410 is not displayed to user 48 to disable 306 access to the collaboration session. Other techniques to disable 306 access to the collaboration session may also be used without departing from the scope of the disclosure.

Figure 6:
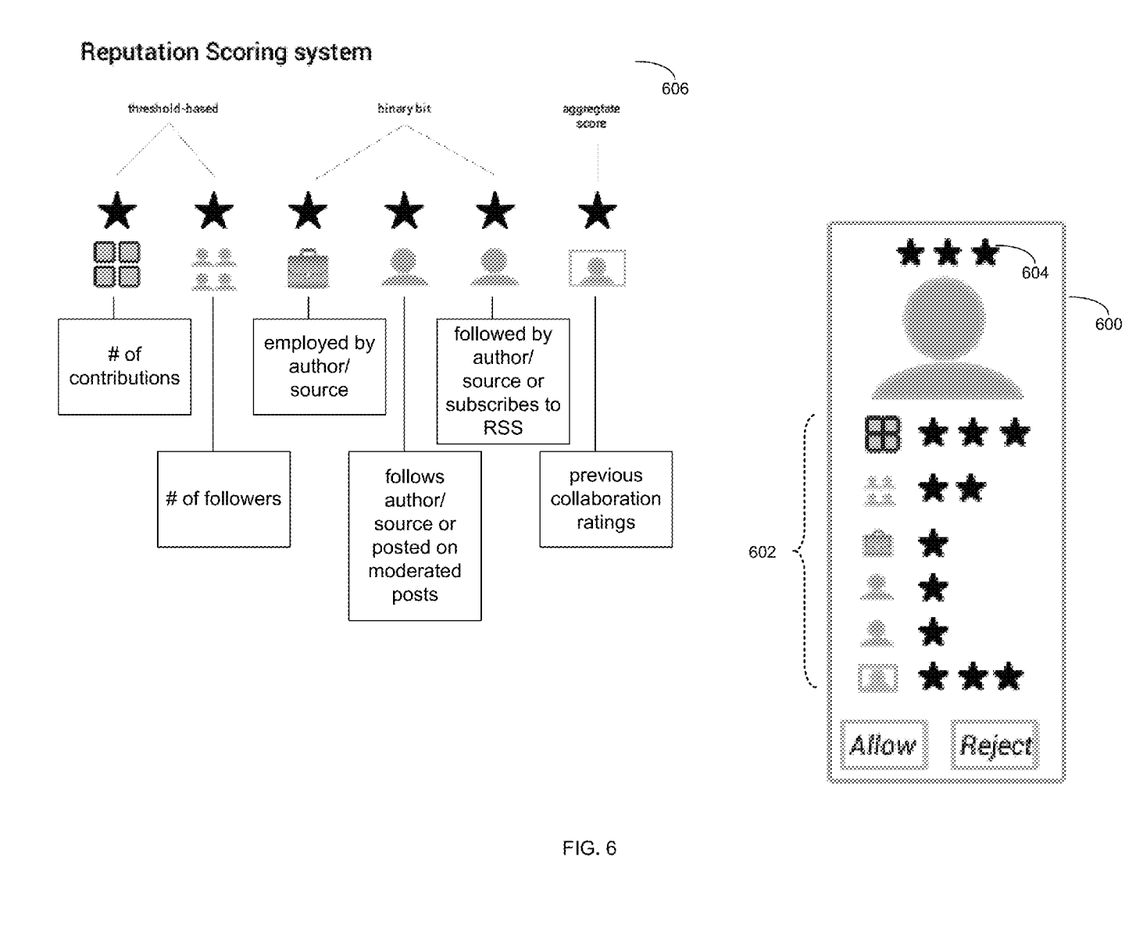
FIG. 6 is an illustrative diagrammatic view of a screen image displayed by the reputation process of FIG. 1 according to one or more implementations of the present disclosure.

In some implementations, and referring at least to FIG. 6, reputation process 10 may provide a notification, e.g., notification 600 to user 46 indicating that user 48 has requested to access the collaboration session of article 402. In some implementations, the notification may include the reputation of user 48 associated with each individual parameter 602 established on the above-noted reputation profile (and/or sub-reputation profile), as well as overall reputation 604 based upon, at least in part, each parameter 602. For example, and as shown via example key 606, the notification may include the number of users connected to user 48, the number of contributions made by user 48, the number of social interactions on those contributions, etc. The notification may also provide user 46 with the ability to accept or deny the request for user 48 to connect to the collaboration session. In some implementations, the request to connect to the collaboration session may be automatically accepted by reputation process 10 without user 46 manually accepting the request.

In some implementations, the scoring of the reputation of user 48 may include, e.g., a threshold-based scoring system, a binary bit scoring system, an aggregate scoring system, and combination thereof. For example, if user 48 has a minimum threshold number of contributions and/or followers, user 48 may achieve, e.g., at least one "point" illustrated by example only as a star. In the example, user 48 may attain more stars as subsequent threshold numbers of contributions and/or followers are accumulated. In the example, if user 48 is employed by the author/source of article 402, follows the author/source of article 402 or posted on a post moderated by the author/source of article 402, or followed by the author/source of article 402 or author/source of article 402 subscribed to user 48 via RSS (or combination thereof), user 48 may achieve, e.g., at least one other "point" illustrated by example only as a star. In the example, if user 48 has previous collaboration ratings from other users (e.g., aggregated positive/negative ratings from other users and/or authors of previous collaboration sessions), user 48 may achieve, e.g., at least one other "point" illustrated by example only as a star. In some implementations, the total "points" may be averaged together or otherwise combined to determine overall reputation 604 of user 48. In the above-example, if user 48 has a 3 star reputation, and user 46 has established a threshold reputation of at least 2 stars to participate in the collaboration session, reputation process 10 may enable 304 user 48 to access the collaboration session. Conversely, if user 48 has a 3 star reputation, and user 46 has established a threshold reputation of at least 4 stars to participate in the collaboration session, reputation process 10 may disable 306 user 48 from accessing the collaboration session. In some implementations, the determined 300 reputation threshold requirement may include the average participant reputation of those users currently participating in the collaboration session. For example, if user 48 has a 3 star reputation, and the average participant reputation of those users currently participating in the collaboration session is at least 2 stars, reputation process 10 may enable 304 user 48 to access the collaboration session. In some implementations, this may be true even if user 46 has established a threshold reputation of at least 4 stars to participate in the collaboration session. For example, if not enough users are able to join (or have yet to join) the collaboration session, user 46 (via reputation process 10) may manually and/or automatically change or otherwise override the required threshold to an average reputation of current participants. In the example, once enough users have joined, user 46 (via reputation process 10) may manually and/or automatically change the reputation requirement back.

Figure 7:
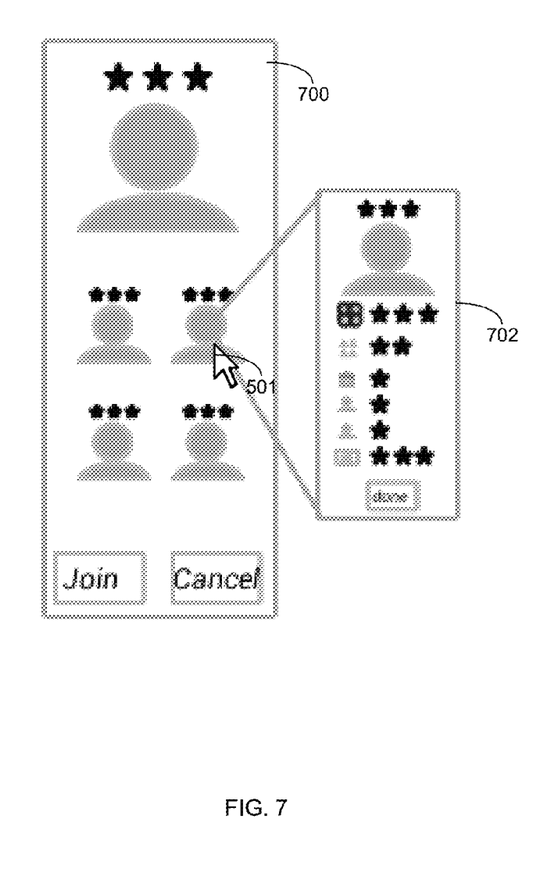
FIG. 7 is an illustrative diagrammatic view of a screen image displayed by the reputation process of FIG. 1 according to one or more implementations of the present disclosure.

In some implementations, and referring at least to FIG. 7, reputation process 10 may enable user 48 to view the current make-up of participants for article 402. For example, user 48 may hover cursor 501 over a particular portion of website 400 associated with article 402 (e.g., object 406), where a, e.g., pop-up window 700 may be rendered by reputation process 10 displaying information about who is participating in the collaboration session and/or their respective overall reputation 604. In some implementations, user 48 may hover cursor 501 over a particular user in the pop-up window, where a, e.g., second pop-up window 702 may be rendered by reputation process 10 displaying the reputation of user 48 associated with each individual parameter 602 established on the above-noted reputation profile (and/or sub-reputation profile). In some implementations, user 46 and/or the administrator of website 400 may disable at least some portions of pop-up windows 700 and/or 702 from being displayed.

With so many news stories and so many different websites covering the same story, user 48 may have a difficult time deciding which conversation or source in which to participate. For example, website 400 may include a cluster of 10 different sources writing different articles for the same news event. To help user 48 decide which article and/or source in which to participate, reputation process 10 may determine 312 a reputation of an entity enabling access to the collaboration session. For example, the entity (e.g., website, source of the article, etc.) may have a reputation that is determined 312 similarly to that of user 48. For example, the greater the number of users that follow the entity, the higher the reputation of the entity. As another example, the more articles posted via the entity, the higher the reputation of the entity. As yet another example, the more social interactions on those articles from different users, the higher the reputation of the entity.

As noted above, reputation process 10 may enable user 48 to view the current make-up of participants for article 402 by, e.g., user 48 hovering cursor 501 over a particular portion of website 400 associated with article 402 (e.g., object 406), where a, e.g., pop-up window (not shown) may be rendered by reputation process 10 displaying information about who is participating in the collaboration session and/or their respective overall reputation 604. In some implementations, similarly, the pop-up window may include the reputation of the entity enabling access to the collaboration session.

As yet another example to help user 48 decide which article and/or source in which to participate, reputation process 10 may determine 314 a reputation of an author of a topic for the collaboration session. For example, the author of article 402 (e.g., user 46) may have a reputation that is determined 314 similarly to that of user 48 and/or the source of article 402. For example, the greater the number of users that follow the author, the higher the reputation of the author. As another example, the more articles posted via the author, the higher the reputation of the author. As yet another example, the more social interactions on those articles from different users, the higher the reputation of the author. In some implementations, the author of article 402 being discussed and the originator of the collaboration session in which the article is discussed may be different. In the case where the author of the article is also the originator of the collaboration session, this may add to the authors/originators reputation (in addition to all the other reputation factors). In some implementations, determining 314 the reputation of the author of the topic for the collaboration session may include reputation process 10 determining 316 whether a relationship exists between the author of the topic for the collaboration session and an entity enabling access to the collaboration session. For example, the relationship may include a connection between the author of the topic for the collaboration session and the entity enabling access to the collaboration session. The connection may include, for example, whether or not the author (e.g., user 46) is an employee of the entity (e.g., the source/website of article 402). As another example, the connection may include whether or not user 46 is following the source/website of article 402. As yet another example, the connection may include whether or not the source/website of article 402 is following user 46. Other examples of determining whether a relationship exists between the author of the topic for the collaboration session and an entity enabling access to the collaboration session may be used without departing from the scope of this disclosure.

As noted above, reputation process 10 may enable user 48 to view the current make-up of participants for article 402 by, e.g., user 48 hovering cursor 501 over a particular portion of website 400 associated with article 402 (e.g., object 406), where a, e.g., pop-up window (not shown) may be rendered by reputation process 10 displaying information about who is participating in the collaboration session and/or their respective overall reputation 604. In some implementations, similarly, the pop-up window may include the reputation of the author of article 402, the reputation of the entity enabling access to the collaboration session, or combination thereof.

In some implementations, the various articles may be rendered by reputation process 10 in an ordered list based upon, at least in part, the reputations of the author of article 402 and/or the current participants. Other techniques of ordering the various articles may be used without departing from the scope of this disclosure. For example, reputation process 10 may provide user 48 with a similar reputation profile to that of reputation profile 500, which may be used to determine which articles to display and/or the preferred order of display.

In some implementations, the author of the collaboration session/article 402 may, e.g., via reputation process 10, at any time during or after the collaboration session, rate the performance of the users participating in the collaboration session. Similarly, each participant in the collaboration session may rate the performance of the author/source of the collaboration session. These ratings may contribute to user's/creator's/sources' previous collaboration session performance score, effecting their respective reputation.

While one or more examples refer to a news web site for news articles, it will be appreciated that other types of websites, channels for video streaming websites, and viewable subject matter (e.g., videos, audio, comments, books, applications, etc.) may also be used without departing from the scope of the disclosure. Furthermore, reputation process 10 may operate within any kind of aggregation app or other kind application besides a website based application (e.g., webapp). For example, reputation process 10 may be used for, e.g., virtual world conferences of avatars in which users are collaborating around a topic in abstract and not a particular piece of media (article, video, book, etc). As such, the use of a news website (and websites generally) and news articles (and particular pieces of media generally) should be taken as an example only and not to limit the scope of the disclosure.

In some implementations, reputation process 10 may enable user 48 and/or user 46 to "opt-out" of sharing information that may be used to determine the reputation of user 48 and/or user 46, as well as the reputation itself of user 48 and/or user 46. In some implementations, reputation process 10 may enable user 48 and/or user 46 to "opt-out" of the ability for others to view the reputation of user 48 and/or information that may be used to determine the reputation of user 48 and/or user 46.

As will be appreciated by one skilled in the art, the present disclosure may be embodied as a method, system, or computer program product. Accordingly, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of this document, a computer-usable or computer-readable, storage medium may be any tangible medium that can contain or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

Computer program code for carrying out operations of the present disclosure may be written in an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript or PERL. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider).

The flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

The computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer-implemented method comprising:
dynamically determining, by a computing device, a reputation threshold requirement for a first user to participate in a conference session of participating users, wherein the reputation threshold requirement is based upon, at least in part, a reputation profile of the conference session including a current average participant reputation of the participating users for the conference session, wherein the current average participant reputation is based upon at least one parameter of: an average of a number of users connected to the participating users, an average of a number of previous contributions by the participating users, and an average of a number of social actions associated with at least a portion of the number of previous contributions by the participating users;
determining whether a reputation of the first user satisfies the reputation threshold requirement for the conference session, based upon, at least in part, comparing the reputation of the first user with the reputation profile for the conference session, wherein the reputation of the first user includes a score based upon, at least in part, combined or averaged points achieved by the first user for each of one or more of: a number of users connected to the first user, a number of previous contributions by the first user, and a number of social actions associated with at least a portion of the number of previous contributions by the first user;
enabling access to the conference session if the reputation of the first user satisfies the reputation threshold requirement for the conference session;

disabling access to the conference session if the reputation of the first user fails to satisfy the reputation threshold requirement for the conference session; and receiving a selection from a controlling user enabling access to the conference session, wherein the selection indicates whether to enable or disable access by the first user to the conference session.

2. A computer-implemented method comprising:

dynamically determining, by a computing device, a reputation threshold requirement for participating in a collaboration session, wherein the reputation threshold requirement is based upon, at least in part, a reputation profile of the collaboration session including a current average participant reputation of participating users for the collaboration session, wherein the current average participant reputation is based upon at least one parameter of: an average of a number of users connected to the participating users, an average of a number of previous contributions by the participating users, and an average of a number of social actions associated with at least a portion of the number of previous contributions by the participating users;

determining whether a reputation of a first user satisfies the reputation threshold requirement for the collaboration session, based upon, at least in part, comparing the reputation of the first user with the reputation profile of the collaboration session; and enabling access of the first user to the collaboration session if the reputation of the first user satisfies the reputation threshold requirement for the collaboration session;

disabling access to the collaboration session if the reputation of the first user fails to satisfy the reputation threshold requirement for the collaboration session; and receiving a selection from a controlling user enabling access to the collaboration session, wherein the selection indicates whether to enable or disable access by the first user to the collaboration session.

3. The computer-implemented method of claim 2 further including enabling access of the first user to the collaboration session if the reputation of the first user fails to satisfy the reputation threshold requirement and if a diversity space is available.

4. The computer-implemented method of claim 2 further comprising determining a reputation of an entity that enables the access to the collaboration session.

5. The computer-implemented method of claim 2 further comprising determining a reputation of an author of a topic for the collaboration session.

6. The computer-implemented method of claim 5 wherein determining the reputation of the author of the topic for the collaboration session includes determining whether a relationship exists between the author of the topic for the collaboration session and an entity that enables the access to the collaboration session.

7. The computer-implemented method of claim 6 wherein the relationship includes a connection between the author of the topic for the collaboration session and the entity that enables the access to the collaboration session.

8. The computer-implemented method of claim 2 wherein the reputation of a first user is based upon, at least in part, a number of users connected to the first user.

9. The computer-implemented method of claim 2 wherein the reputation of the first user is based upon, at least in part, a number of previous contributions by the first user.

10. The computer-implemented method of claim 9 wherein the reputation of the first user is based upon, at least in part, a number of social actions associated with at least a portion of the number of previous contributions by the first user.

11. The computer-implemented method of claim 2 further comprising causing to be displayed the reputation of the first user.

12. A computing system including a processor and a memory configured to perform operations comprising:

dynamically determining a reputation threshold requirement for participating in a collaboration session, wherein the reputation threshold requirement is based upon, at least in part, a reputation profile of the collaboration session including a current average participant reputation of participating users for the collaboration sessions, wherein the current average participant reputation is based upon at least one parameter of: an average of a number of users connected to the participating users, an average of a number of previous contributions by the participating users, and an average of a number of social actions associated with at least a portion of the number of previous contributions by the participating users;

determining whether a reputation of a first user satisfies the reputation threshold requirement for the collaboration session, based upon, at least in part, comparing the reputation of the first user with the reputation profile of the collaboration session; and enabling access to the collaboration session if the reputation of the first user satisfies the reputation threshold requirement for the collaboration session;

disabling access to the collaboration session if the reputation of the first user fails to satisfy the reputation threshold requirement for the collaboration session; and receiving a selection from a controlling user enabling access to the collaboration session, wherein the selection indicates whether to enable or disable access by the first user to the collaboration session.

13. The computing system of claim 12 further comprising enabling access of the first user to the collaboration session if the reputation of the first user fails to satisfy the reputation threshold requirement and a diversity space is available.

14. The computing system of claim 12 further comprising determining a reputation of an entity that enables the access to the collaboration session.

15. The computing system of claim 12 further comprising determining a reputation of an author of a topic for the collaboration session.

16. The computing system of claim 15 wherein determining the reputation of the author of the topic includes determining whether a relationship exists between the author of the topic and an entity that enables the access to the collaboration session.

17. The computing system of claim 16 wherein the relationship includes the author of the topic following the entity or the entity following the author of the topic.

18. The computing system of claim 12 wherein the reputation of the first user is based upon, at least in part, a number of users connected to the first user.

19. The computing system of claim 12 wherein the reputation of the first user is based upon, at least in part, a number of previous contributions by the first user.

20. The computing system of claim 12 further comprising causing to be displayed the reputation of the first user.

* * * * *